United States Patent [19]

Deville et al.

[11] Patent Number: 5,101,861

[45] Date of Patent: Apr. 7, 1992

[54] SLIDE VALVE

[75] Inventors: Patrice Deville, Annecy; Luc Mathieu, Annecy le Vieux, both of France

[73] Assignee: Alcatel CIT, Paris, France

[21] Appl. No.: 729,232

[22] Filed: Jul. 12, 1991

[30] Foreign Application Priority Data

Jul. 16, 1990 [FR] France .................. 90 09046

[51] Int. Cl.⁵ .............................................. F16K 3/18
[52] U.S. Cl. .............................. 137/630.12; 251/167;
251/176; 251/197
[58] Field of Search ............... 137/630.12, 630.15;
251/167, 176, 197

[56] References Cited

U.S. PATENT DOCUMENTS

| 1,559,515 | 10/1925 | Bottner | 137/630.12 |
| 1,932,471 | 10/1933 | McKellar | 137/630.12 |
| 2,670,752 | 3/1954 | Laurent | |
| 4,779,649 | 10/1988 | Balter | 137/630.12 |

FOREIGN PATENT DOCUMENTS

| 430606 | 6/1926 | Fed. Rep. of Germany . |
| 681510 | 9/1939 | Fed. Rep. of Germany . |
| 1227297 | 10/1966 | Fed. Rep. of Germany . |
| 1945901 | 9/1970 | Fed. Rep. of Germany . |
| 2806737 | 8/1979 | Fed. Rep. of Germany . |
| 3028786 | 3/1983 | Fed. Rep. of Germany . |

Primary Examiner—Robert G. Nilson
Attorney, Agent, or Firm—Sughrue, Mion, Zinn, Macpeak & Seas

[57] ABSTRACT

A slide valve comprising: a valve body having two axially aligned openings provided with means for connection in a duct; a drive rod; a valve member; and a backing member; wherein the valve member includes a hollow opening out to both faces of the valve member and fitted with a piston movable between a simple abutment at one end and a shoulder in the hollow at an opposite end, the piston bearing against said shoulder via sealing means, a return spring urging said piston towards said simple abutment, said piston including, at its simple abutment end, means for co-operating with a sloping ramp of said drive rod such that during closure of the valve, the piston is thrust against said shoulder of the hollow.

2 Claims, 8 Drawing Sheets

SLIDE VALVE

The present invention relates to a slide valve and is suitable for vacuum applications, in particular for isolating ducts.

BACKGROUND OF THE INVENTION

The presence of a slide valve in a duct in a vacuum installation requires a second valve generally referred to as a "bypass" valve to be connected in parallel therewith.

Thus, one known configuration comprises a slide valve coupled in parallel with a second valve of the "gas valve" type which makes it possible to reestablished pressure equilibrium on opposite sides of the valve member of the slide valve prior to opening it.

The "gas valve" thus serves to avoid excessive molecular disturbance between the two previously-isolated portions of the duct when opening the slide valve.

This system requiring two valves is expensive and also requires a special configuration to enable the gas valve to be integrated in parallel as a bypass valve.

SUMMARY OF THE INVENTION

The present invention seeks to mitigate this drawback and provides a slide valve comprising: a valve body having two axially aligned openings provided with means for connection in a duct; a drive rod; a valve member; and a backing member; wherein the valve member includes a hollow opening out to both faces of the valve member and fitted with a piston movable between a simple abutment at one end a shoulder in the hollow at an opposite end, the piston bearing against said shoulder via sealing means, a return spring urging said piston towards said simple abutment, said piston including, at its simple abutment end, means for co-operating with a sloping ramp of said drive rod such that during closure of the valve, the piston is thrust against said shoulder of the hollow.

Preferably, the drive rod carries a transverse thrust pin having each of its ends placed between a respective pair of springs, one spring in each pair being fixed to the valve member and the other spring of each pair being fixed to the backing member, said thurst pin serving initially during valve closure to move the valve member and backing member assembly into abutment against the bottom of the valve body by said thrust pin bearing against said springs, and secondly to thrust the value member and the backing member against their respective seats by compressing said springs under the effect of said thurst pin advancing between the two springs in each pair, the valve member and the backing member being provided with at least one return spring, the drive rod further including a drive stud which penetrates into an opening in the backing member, said stud serving during valve opening to displace the valve member and backing member assembly longitudinally after said thrust pin has slid between the two springs of each pair to cease compressing said springs, with the assembly being moved by the drive stud coming into abutment against one end of said opening.

BRIEF DESCRIPTION OF THE DRAWINGS

An embodiment of the invention is described by way of example with reference to the accompanying drawings, in which.

DETAILED DESCRIPTION

Figure 1:
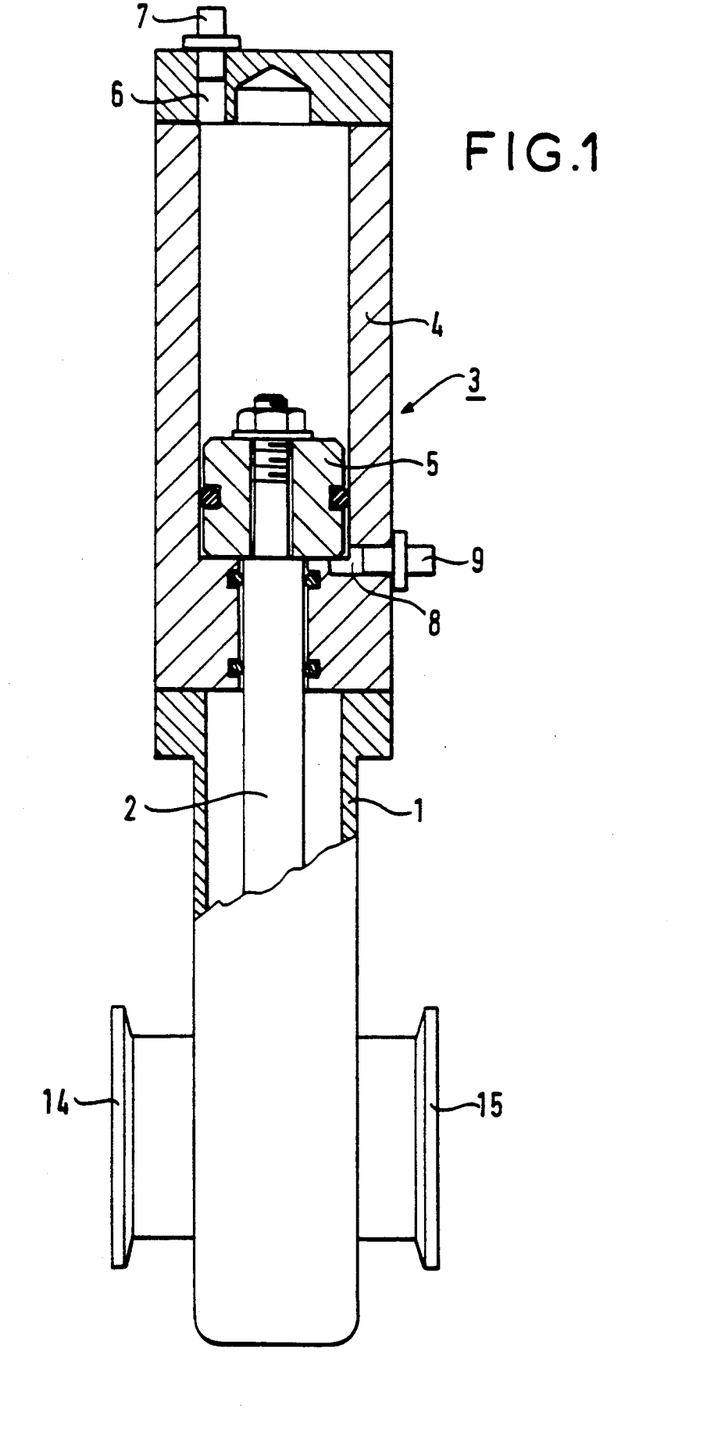
FIG. 1 is a partial section through a valve of the invention.

A slide valve of the invention can be seen in FIG. 1. This valve essentially comprises two portions: the valve per se situated in the bottom half of the figure and represented in FIG. 1 merely by a valve body 1 and a drive rod 2; and a control actuator 3 connected to the valve body 1 and situated in the top half of the figure. The control actuator 3 comprises a cylinder 4 and a piston 5 connected to the drive rod 2. The cylinder 4 of the actuator has a first orifice 6 at its top end provided with an end fitting 7 for connection to a coupling for a control fluid for closing the valve. The cylinder 4 further includes a second orifice 8 provided with an end fitting 9 for connection to a coupling for a control fluid for opening the valve.

Figure 4:
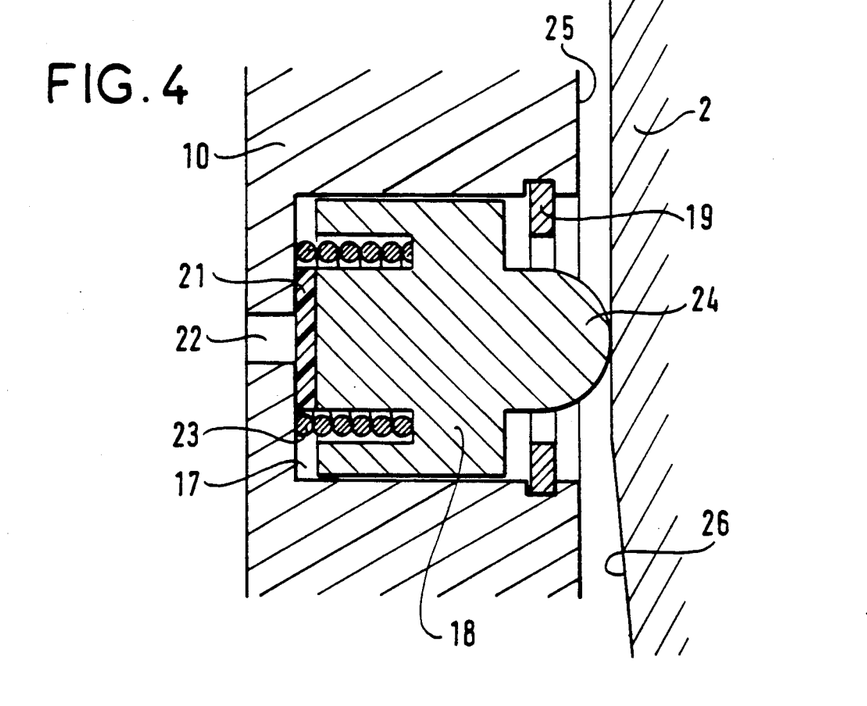
FIGS. 4 and 5 are respective details IV and V of FIGS. 2 and 3.

The control actuator 3 is not shown in the other figures since the invention lies in the valve per se, with only the outside thereof being shown in the bottom half of FIG. 4.

Figure 2:
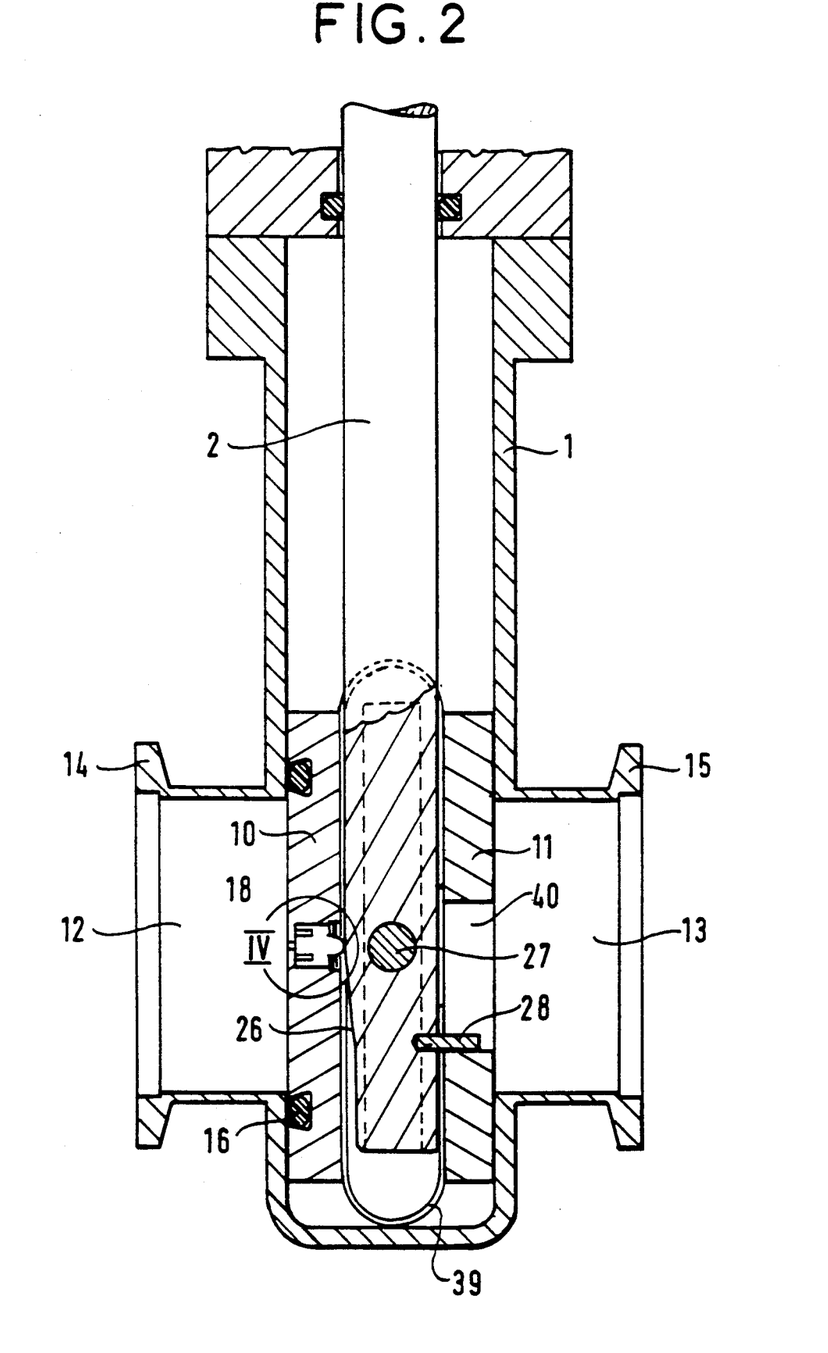
FIG. 2 is a fragmentary section showing the valve in its closed position.

FIG. 2 shows the valve in its closed position. In addition to the drive rod 2, this figure shows the closure valve member 10 and a backing member 11. The valve body 1 has two axially aligned openings 12 and 13 fitted with flanges 14 and 15 for connection in a duct. The valve member 10 is provided with a sealing O-ring 16.

Figure 3:
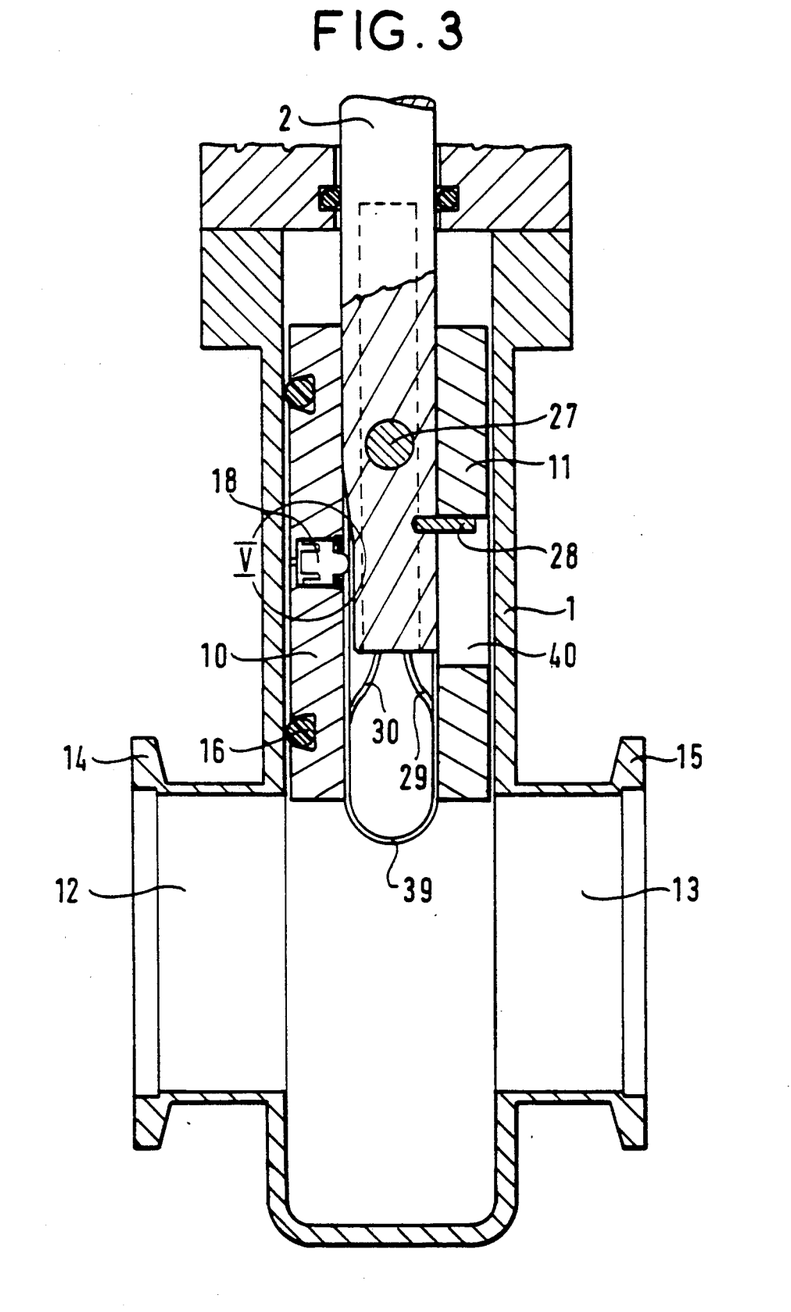
FIG. 3 is a fragmentary section showing the valve in its open position.

In FIG. 3, the valve is shown in its open position.

Figure 5:
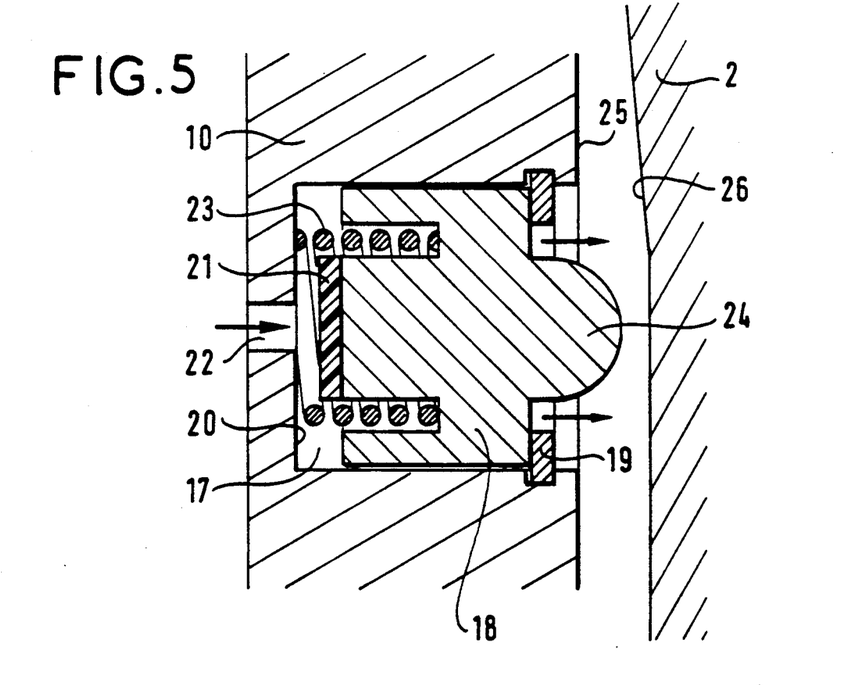
Figure 6:
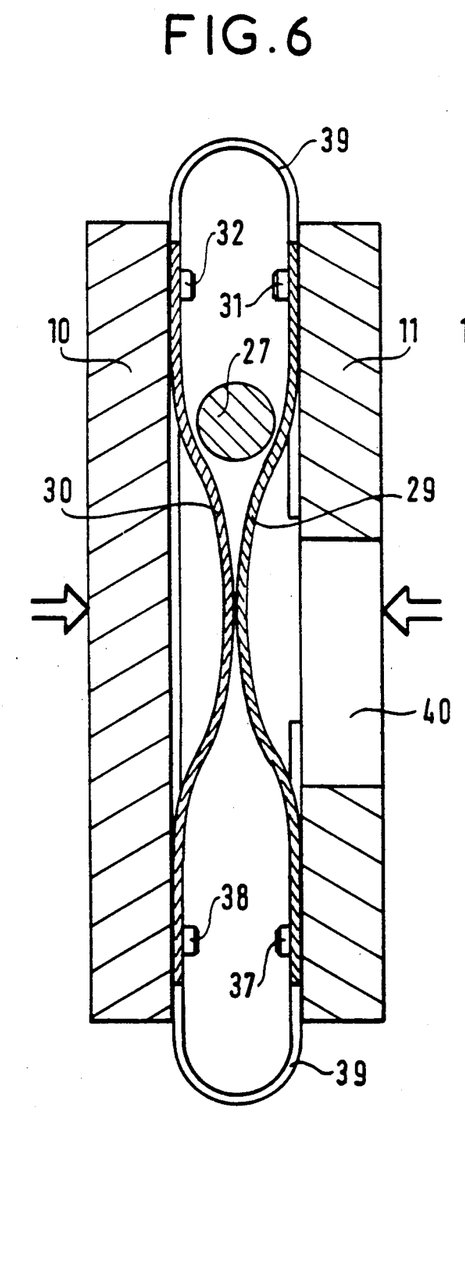
FIGS. 6 and 7 show the valve members and the backing members of the valve together with application and return springs, respectively in the open position and in the closed position of the valve.

The valve member 10 is provided with a bypass system referenced IV and V in FIGS. 2 and 3 and shown in detail and on a large scale in FIGS. 4 and 5, respectively in the open position and in the closed position.

For this purpose, the valve member 10 includes a hollow 17 open to both faces of the valves member 10. This hollow is fitted with a piston 18 movable between a shoulder 20 in the hollow and a simple abutment 19 constituted by a spring clip. At its shoulder end, the piston 18 is provided with a flat gasket 21 for providing gastight closure of the orifice 22 opening out from the hollow 17 when the piston 18 is pressed against the shoulder 20. In its rest position, the piston 18 is pressed against the abutment 19 by a return spring 23. At its end opposite to the flat gasket 21, the piston 18 has a projection 24 which projects beyond the inside face 25 of the valve member 10 and which co-operates with a sloping ramp 26 on the drive rod 2. When the drive rod 2 moves downwards, i.e. while the valve is being closed, the sloping ramp 26 pushes back the piston 18 until the orifice 22 is closed by the flat gasket 21 on the piston.

Figure 9:
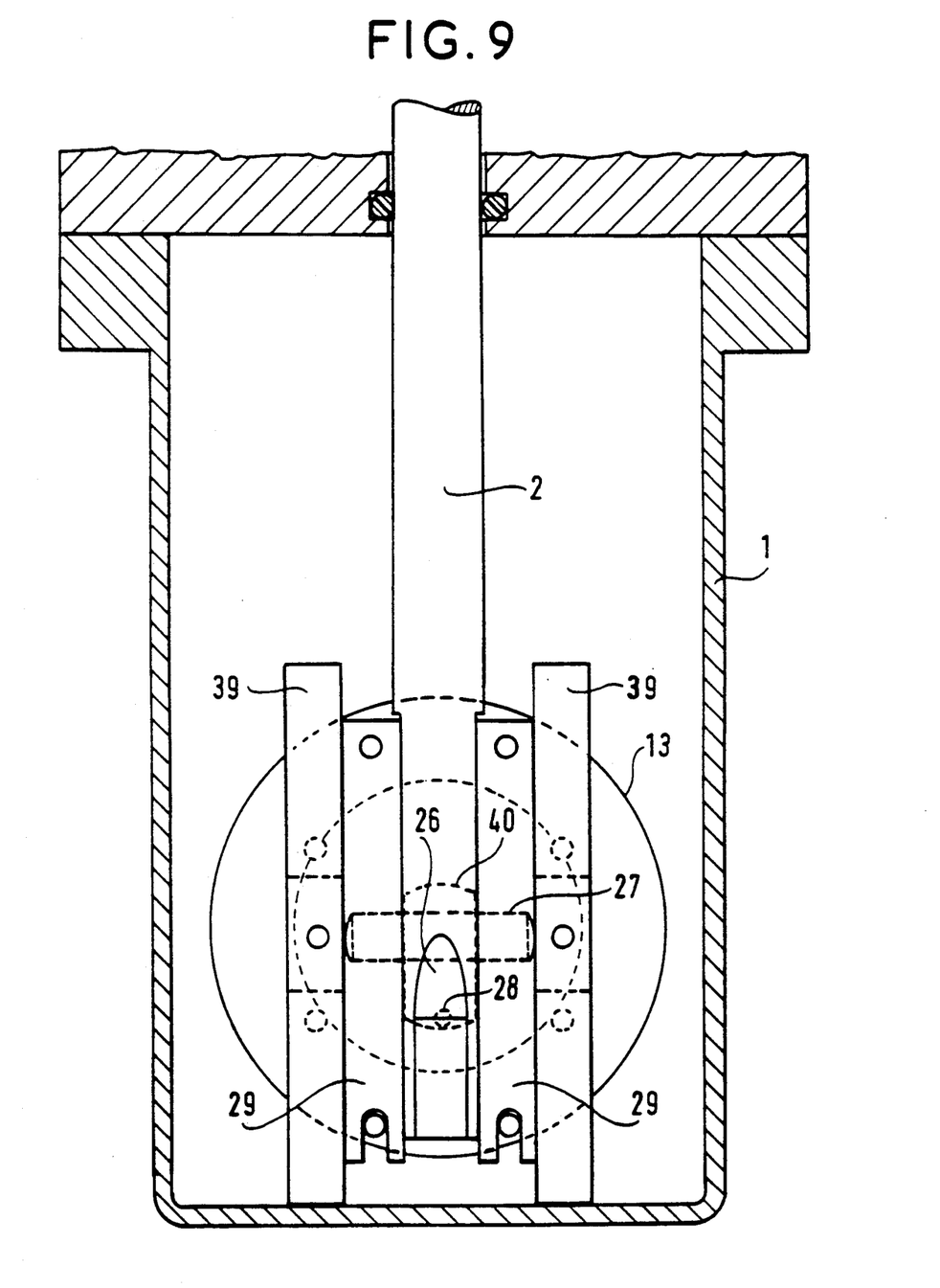
FIG. 9 is a view from the left of FIG. 2 in which the valve body is in section and from which the valve member has been removed, thus showing only the drive rod, the springs, and the backing member.
Figure 10:
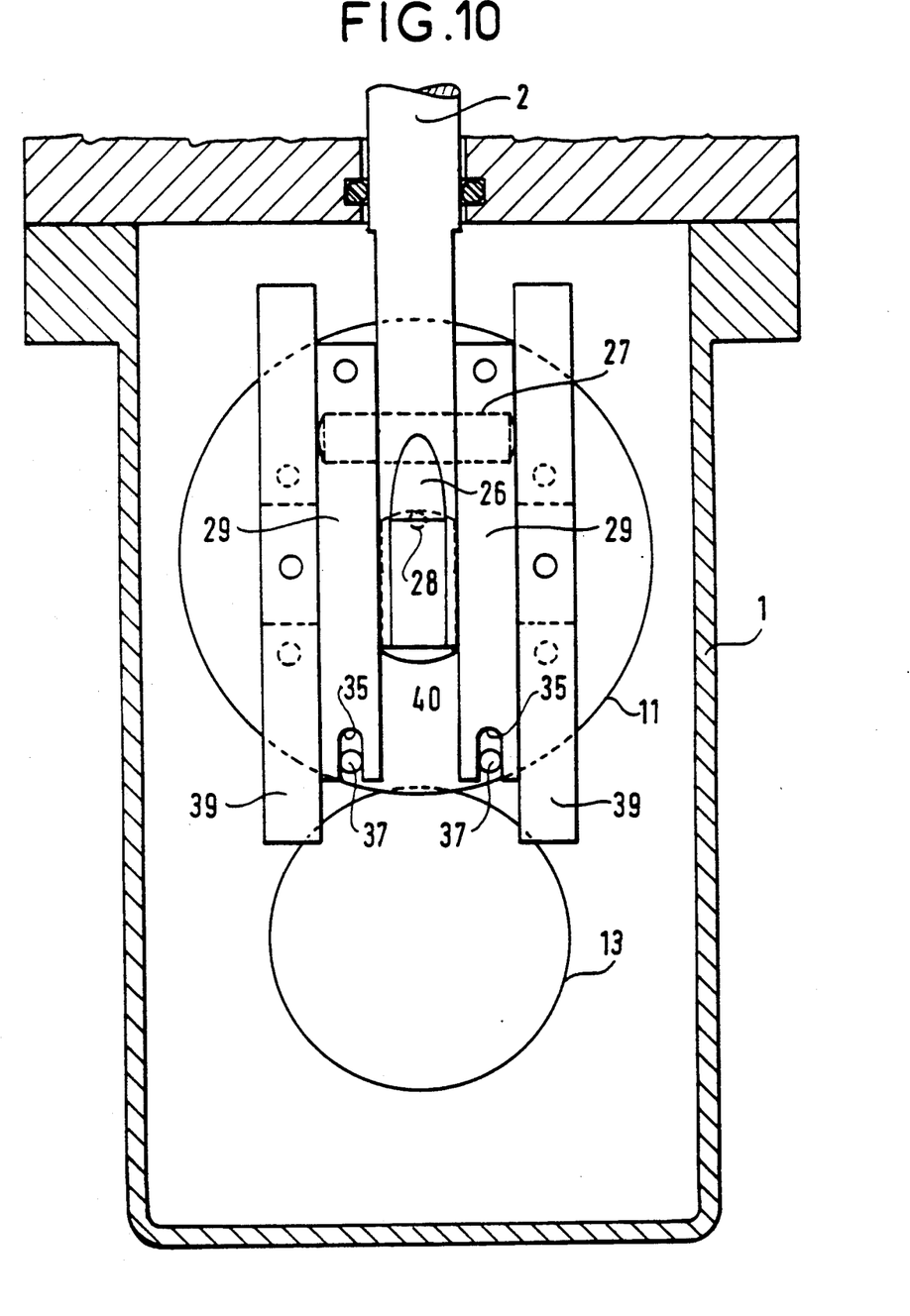
FIG. 10 corresponds to FIG. 9 but with the valve in its open position. i.e. it corresponds to FIG. 3.

The drive rod 2 further includes both a transverse thrust pin 27 visible in section in FIGS. 2, 3, 6, and 7, and in side view in FIGS. 9 and 10, and also a drive stud 28 visible in axial section in FIGS. 2 and 3, and end-on (as a hidden dashed-line view) in FIGS. 9 and 10.

Figure 7:
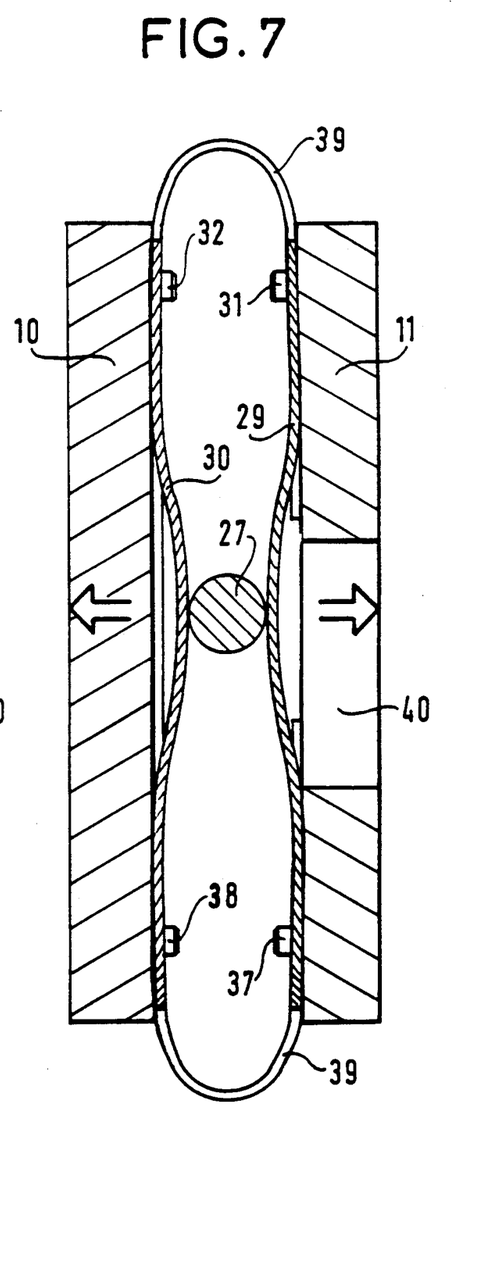
Figure 8:
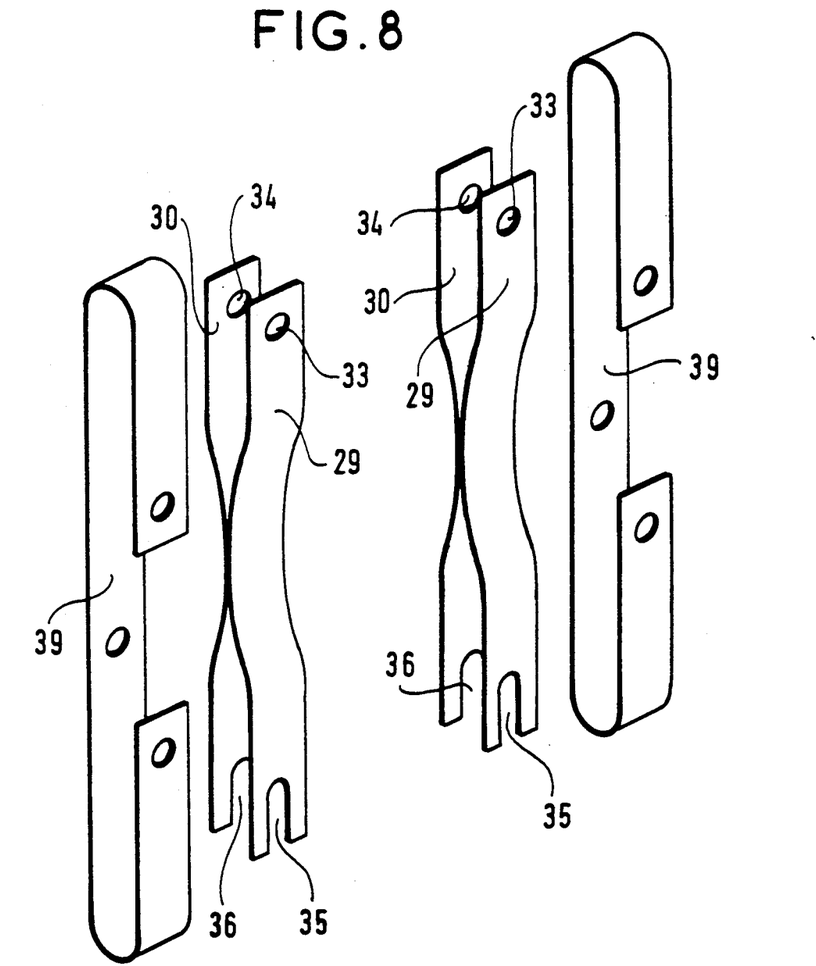
FIG. 8 is an exploded perspective view showing only the application and return springs for the valve member and the backing member of the valve.

The functions of the drive pin 27 are firstly during valve closure to drive the valve member and backing member assembly 10, 11 downwards by the pin 27 bearing against two pairs of thrust springs 29 and 30 (FIGS. 6, 7, and 8) connected to the valve member and to the backing member at one their ends by pegs 31 and 32 passing through holes 33 and 34 in the springs and sliding freely at their opposite ends by means of respective oblong slots 35 and 36 engaging pegs 37 and 38, and secondly, when the assembly is in abutment against the bottom of the valve body 11, as shown in FIGS. 2 and 9, continuing downwards motion of the drive rod 2 causes the thrust pin 27 to penetrate between the two pairs of spring 29 and 30 as can be seen in FIG. 7, thereby thrusting the valve member 10 and the backing member 11 against their respective seats. The valve member 10 and the backing member 11 are also provided with a pair of return springs 39.

The function of the drive stud 28 during opening of the valve is to drive the valve member and backing member assembly upwards by the stud 28 coming into abutment against the top end of an opening 40 formed through the backing member 11. When the drive rod 2 begins to rise, the valve member and backing member assembly remains in its low position, with the sloping ramp 26 of the rod sliding against the piston 18 which moves in translation to the right, thereby releasing the orifice 22, and simultaneously the thrust pin 27 disengages from the springs 29 and 30. When the stud 28 comes into abutment against the top end of the opening 40, the thrust pin 27 is fully disengaged from the thrust springs 29 and 30 so the return springs 39 then enable the valve member and the backing member to lift off their respective seats and enables them to be raised without friction until the openings 12 and 13 are fully disengaged.

During valve closure, the thrust pin 27 drives the valve member and backing member assembly downwards without friction as described above by the pin 27 bearing against the springs 29 and 30, but without moving them apart since assembly offers no resistance to being moved downwards, and it is only when the return springs 39 come into abutment against the bottom of the body 1 (FIG. 9) that the pin 27 continues its stroke with the drive rod 2, thereby compressing the spring blades 29 and 30. It is also during this stage that the sloping ramp 26 pushes the piston 18 to the bottom of its hollow 17 urging the flat gasket 31 against the shoulder 20 and thus closing the orifice 22 in gastight manner.

As can be seen, during valve opening, the piston 18 releases the orifice 22 during a first stage before the valve member and the backing member move off their seats, thereby enabling the pressures on both sides of the duct to reach equilibrium before the valve is opened.

We claim:

1. A slide valve comprising: a valve body having two axially aligned openings provided with means for connection in a duct; a drive rod; a valve member; and a backing member; wherein the valve member includes a hollow opening out to both faces of the valve member and fitted with a piston movable between a simple abutment at one end and a shoulder in the hollow at an opposite end, the piston bearing against said shoulder via sealing means, a return spring urging said piston towards said simple abutment, said piston including, at its simple abutment end, means for co-operating with a sloping ramp of said drive rod such that during closure of the valve, the piston is thrust against said shoulder of the hollow.

2. A slide valve according to claim 1, wherein the drive rod carries a transverse thrust pin having each of its end placed between a respective pair of springs, one spring in each pair being fixed to the valve member and the other spring of each pair being fixed to the backing member, said thrust pin serving initially during valve closure to move the valve member and backing member assembly into abutment against the bottom of the valve body by said thrust pin bearing against said springs, and secondly to thrust the valve member and the backing member against their respective seats by compressing said springs under the effect of said thrust pin advancing between the two springs in each pair, the valve member and the backing member being provided with at least one return spring, the drive rod further including a drive stud which penetrates into an opening in the backing member, said stud serving during valve opening to displace the valve member and backing member assembly longitudinally after said thrust pin has slid between the two springs of each pair to cease compressing said springs, with the assembly being moved by the drive stud coming into abutment against one end of said opening.

* * * * *